United States Patent
Chu et al.

(10) Patent No.: US 9,313,144 B2
(45) Date of Patent: Apr. 12, 2016

(54) NETWORK RESOURCE MANAGEMENT FOR PARALLEL COMPUTING

(71) Applicant: ALCATEL-LUCENT USA INC., Murray Hill, NJ (US)

(72) Inventors: Thomas P. Chu, Englishtown, NJ (US); Huseyin Uzunalioglu, Millington, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 118 days.

(21) Appl. No.: 14/138,491

(22) Filed: Dec. 23, 2013

(65) Prior Publication Data

US 2015/0180796 A1  Jun. 25, 2015

(51) Int. Cl.
*H04L 12/911* (2013.01)
*H04L 12/24* (2006.01)

(52) U.S. Cl.
CPC ............ *H04L 47/70* (2013.01); *H04L 41/0896* (2013.01)

(58) Field of Classification Search
CPC ........................................ H04L 47/70
USPC ............................................. 709/226
See application file for complete search history.

(56) References Cited

U.S. PATENT DOCUMENTS

| | | | | |
|---|---|---|---|---|
| 2012/0060165 | A1* | 3/2012 | Clarke | 718/104 |
| 2012/0151057 | A1* | 6/2012 | Paredes et al. | 709/225 |
| 2012/0311568 | A1* | 12/2012 | Jansen | G06F 9/45558 718/1 |
| 2012/0317237 | A1* | 12/2012 | Kazan et al. | 709/219 |
| 2013/0268588 | A1* | 10/2013 | Chang et al. | 709/204 |
| 2013/0283364 | A1* | 10/2013 | Chang et al. | 726/12 |
| 2015/0026336 | A1* | 1/2015 | Suchter et al. | 709/224 |

* cited by examiner

*Primary Examiner* — Brian J Gillis
*Assistant Examiner* — Steve Lin
(74) *Attorney, Agent, or Firm* — Carlson, Gaskey & Olds, P.C.

(57) ABSTRACT

An illustrative example computing system includes a parallel computing controller configured to communicate control information with a plurality of computing nodes over a virtual private network. A cloud computing controller is configured to receive a communication from the parallel computing controller. Based at least in part on the received communication, the cloud computing controller allocates cloud computing resources to facilitate data traffic communication involving at least one of the plurality of computing nodes.

18 Claims, 6 Drawing Sheets

NETWORK RESOURCE MANAGEMENT FOR PARALLEL COMPUTING

TECHNICAL FIELD

The subject matter of this document relates to parallel computing using cloud computing resources. More particularly, the subject matter relates to managing cloud computing resources for handling different types of traffic involved with parallel computing.

BACKGROUND

Common cloud computing data centers are based on an architecture that includes a large number of processor boards mounted in rows of racks with associated switches for communications among the processors and with outside network elements. Cloud computing often involves virtual machines that are activated to support an application or a computing process. A network manager or cloud controller facilitates connections among the virtual machines and allocates cloud computing resources for particular applications or computing processes.

With increased acceptance and use of cloud computing systems, a wider variety of a capabilities are needed. For example, some applications require a relatively large amount of processing. One way to take advantage of the multiple processors associated with a cloud system is to divide an application into a number of subtasks that are executed in parallel on separate processors or virtual machines, which reduces computation time. Known techniques for implementing parallel computing include the MapReduce procedure proposed by Google and one implementation of that procedure is accomplished using a Hadoop open source software framework introduced by Apache. Such parallel computing arrangements introduce efficiencies and economies.

One of the drawbacks associated with known approaches is that the resources allocated for parallel computing sometimes have to handle large amounts of data traffic and relatively smaller amounts of control traffic. If an insufficient amount of the cloud computing resources are allocated to the parallel computing task, the user may experience poor performance or delays when there are large data transfers. If too much of the resource is allocated, then much of the resource may go unused during periods when there is only minor control traffic communication among the processors or virtual machines.

SUMMARY

An illustrative example computing system includes a parallel computing controller configured to communicate control information with a plurality of computing nodes over a virtual private network. A cloud computing controller is configured to receive a communication from the parallel computing controller. Based at least in part on the received communication, the cloud computing controller allocates cloud computing resources to facilitate data traffic communication involving at least one of the plurality of computing nodes.

In an example system having one or more features of the system of the previous paragraph the cloud computing controller is configured to establish a logical connection between the allocated cloud computing resources, and tear down the logical connection once the data traffic communication is complete.

In an example system having one or more features of the system of any of the previous paragraphs the data traffic communication includes a data transfer involving at least one of the plurality of computing nodes.

In an example system having one or more features of the system of any of the previous paragraphs the parallel computing controller is configured to determine a traffic profile for the data traffic communication, determine information that facilitates identifying data flow in the network, determine the quality of service level of the communication, and provide an indication of the traffic profile. The cloud computing controller is configured to receive the indication from the parallel computing controller, identify cloud network resources capable of handling the indicated traffic profile, and allocate the identified cloud network resources to facilitate the data traffic communication.

In an example system having one or more features of the system of any of the previous paragraphs the communication from the parallel computing controller includes the indication of the determined traffic profile, an indication of the at least one of the computing nodes involved in the data traffic communication, and an indication of a service level for the data traffic communication.

In an example system having one or more features of the system of any of the previous paragraphs the cloud computing controller is configured to determine a path for a logical connection including the at least one of the computing nodes, the determined path being able to support the traffic profile and service level of the data traffic communication; command a plurality of switches of the cloud computing resources to establish the logical connection; and notify the parallel computing controller if the logical connection is established.

In an example system having one or more features of the system of any of the previous paragraphs the parallel computing controller is configured to notify the at least one of the computing nodes that the logical connection is established; and the at least one of the computing nodes is able to conduct the data traffic communication based on being notified of the logical connection by the parallel computing controller.

In an example system having one or more features of the system of any of the previous paragraphs the communication from the parallel computing controller identifies at least one of the plurality of computing nodes that is authorized to communicate with the cloud computing controller; and the cloud computing controller is configured to receive a request from the authorized computing node, the request indicating a traffic profile, data flow identifiers, and a service level for the data traffic communication, identify cloud computing resources capable of supporting the traffic profile and service level, and allocate the identified cloud network resources to facilitate the data traffic communication.

In an example system having one or more features of the system of any of the previous paragraphs the request from the authorized computing node includes an indication of at least one source or recipient of data involved in the data traffic communication; the request from the authorized computing node includes an indication of a quality of service for the data traffic communication; the cloud computing controller determines a logical connection that is capable of handling the traffic for the data traffic communication between the authorized computing node and the indicated source or recipient at the indicated quality of service; the authorized computing node provides a completion indication to the cloud computing controller that the data traffic communication is complete; and the cloud computing controller removes the logical connection responsive to the completion indication.

In an example system having one or more features of the system of any of the previous paragraphs the data traffic communication comprises a plurality of data unit transfers;

the communication from the parallel computing controller includes an identifier of a partition that includes a plurality of the computing nodes, an identifier for the computing nodes that will be sending or receiving data for the data unit transfers, an allowable number of concurrent data unit transfers for the identified computing nodes, and a desired performance characteristic for the data unit transfers, respectively. The cloud computing controller determines forwarding tables among switches included in the cloud computing resources, the forwarding tables establishing logical connections among the computing nodes that are included in the partition; the cloud computing controller notifies the parallel computing controller when the forwarding tables are established; the parallel computing controller informs the plurality of computing nodes in the partition that the data unit transfers of the data traffic communication may proceed; the parallel computing controller provides a completion notification to the cloud computing controller when the data unit transfers are complete; and the cloud computing controller deletes the forwarding tables based on the completion notification.

An illustrative example method of managing resources for parallel computing in a cloud computing system includes computing control information between a parallel computing controller and a plurality of computing nodes over a virtual private network. A communication from the parallel computing controller is received at a cloud computing controller. Cloud computing resources are allocated, based at least in part on the received communication, to facilitate data traffic communication involving at least one of the plurality of computing nodes.

An example method having one or more features of the method of the previous paragraph includes establishing a logical connection between the allocated cloud computing resources, and tearing down the logical connection once the data traffic communication is complete.

In an example method having one or more features of the method of any of the previous paragraphs the data traffic communication includes a data transfer involving at least one of the plurality of computing nodes.

An example method having one or more features of the method of any of the previous paragraphs includes determining an amount of bandwidth for the data traffic communication; providing an indication of the determined amount of bandwidth from the parallel computing controller to the cloud computing controller; the cloud computing controller identifying cloud computing resources capable of handling the determined amount of bandwidth; and the cloud computing controller allocating the identified cloud computing resources to facilitate the data traffic communication.

In an example method having one or more features of the method of any of the previous paragraphs the communication from the parallel computing controller includes the indication of the determined amount of bandwidth, an indication of the at least one of the computing nodes involved in the data traffic communication, and an indication of a service level for the data traffic communication.

An example method having one or more features of the method of any of the previous paragraphs includes using the cloud computing controller to determine a path for a logical connection including the at least one of the computing nodes, the determined path being able to support the traffic load of the data traffic communication; command a plurality of switches of the cloud computing resources to establish the logical connection; and notify the parallel computing controller if the logical connection is established.

An example method having one or more features of the method of any of the previous paragraphs includes notifying the at least one of the computing nodes that the logical connection is established; and wherein the at least one of the computing nodes is able to conduct the data traffic communication based on being notified of the logical connection by the parallel computing controller.

In an example method having one or more features of the method of any of the previous paragraphs the communication from the parallel computing controller identifies at least one of the plurality of computing nodes that is authorized to communicate with the cloud computing controller; and the method comprises receiving a request at the cloud computing controller from the authorized computing node, the request indicating bandwidth needed for the data traffic communication; identifying cloud computing resources capable of providing the bandwidth; and allocating the identified cloud computing resources to facilitate the data traffic communication.

In an example method having one or more features of the method of any of the previous paragraphs the request from the authorized computing node includes an indication of at least one source or recipient of data involved in the data traffic communication; the request from the authorized computing node includes an indication of a quality of service for the data traffic communication; and the method comprises the cloud computing controller determining a logical connection that is capable of handling the traffic for the data traffic communication between the authorized computing node and the indicated source or recipient at the indicated quality of service; the authorized computing node providing a completion indication to the cloud computing controller that the data traffic communication is complete; and the cloud computing controller removing the logical connection responsive to the completion indication.

In an example method having one or more features of the method of any of the previous paragraphs the data traffic communication comprises a plurality of data unit transfers; the communication from the parallel computing controller includes an identifier of a partition that includes a plurality of the computing nodes, an identifier for the computing nodes that will be sending or receiving data for the data unit transfers, an allowable number of concurrent data unit transfers for the identified computing nodes, and a desired performance characteristic for the data unit transfers, respectively; and the method comprises the cloud computing controller determining forwarding tables among switches included in the cloud computing resources, the forwarding tables establishing logical connections among the computing nodes that are included in the partition; the cloud computing controller notifying the parallel computing controller when the forwarding tables are established; the parallel computing controller informing the plurality of computing nodes in the partition that the data unit transfers of the data traffic communication may proceed; the parallel computing controller providing a completion notification to the cloud computing controller when the data unit transfers are complete; and the cloud computing controller deleting the forwarding tables based on the completion notification.

Various features associated with disclosed example embodiments will become apparent to those skilled in the art from the following detailed description. The drawings that accompany the detailed description can be briefly described as follows.

DETAILED DESCRIPTION

Figure 1:
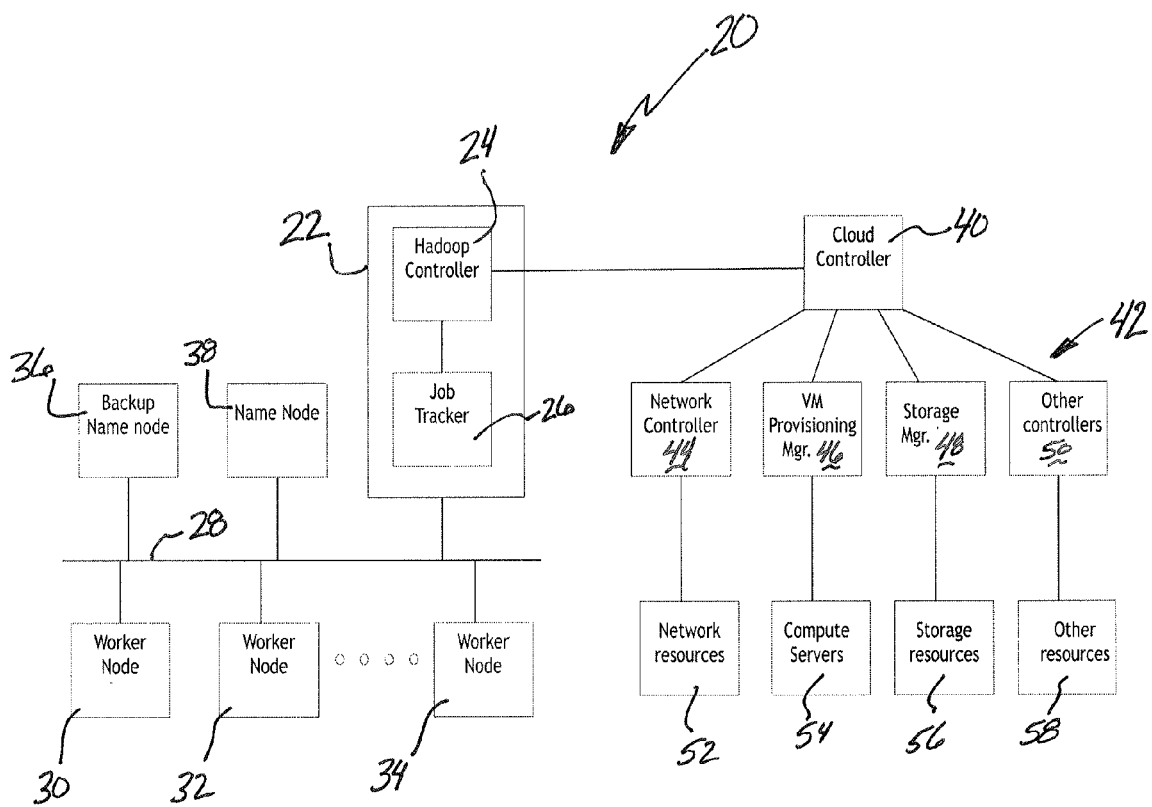
FIG. 1 schematically illustrates a system designed according to an embodiment of this invention.

FIG. 1 schematically illustrates a computing system 20 that is configured to facilitate a parallel computing process utilizing cloud computing resources. A parallel computing controller 22 includes a plurality of modules. For example, the module 24 is a Hadoop control module and the module 26 is a job tracker module. The parallel computing controller 22 communicates over a virtual private network represented at 28 with a plurality of computing nodes such as those schematically represented at 30, 32, and 34. The illustrated example also includes control nodes 36 and 38, which are a name node and a back-up name node in this example, manage the storage process of the Hadoop cluster while the job tracker module 26 manages the compute process. The virtual private network (VPN) 28 is used in this example for control traffic communications among the computing nodes 30-38 and the parallel computing controller 22.

For discussion purposes, the parallel computing controller 22 and the computing nodes 30-38 are described as part of a Hadoop framework. This is one example parallel computing framework and other embodiments are possible. A Hadoop framework is selected for discussion purposes because the Hadoop framework has gained wide acceptance as a useful software architecture for parallel computing data analytics applications.

In the example of FIG. 1, the controller module 24 is arranged as a Hadoop controller, which may be a software module residing on a processor or used in a virtual machine. The Hadoop controller module 24 facilitates communications between the parallel computing controller 22 and a cloud controller 40, which performs control functions over cloud computing resources schematically shown at 42. The controller module 26 in this example is a job tracker module that manages the computation processing in a Hadoop framework. The job tracker module 26 may determine which of the computing nodes is going to execute a particular job or task using known techniques.

The computing nodes 30, 32 and 34 in this example may be referred to as worker nodes that include a data node portion and a task tracker portion. The worker nodes 30-34 may store a number of file segments of Hadoop files according to instructions from the name node 38, which manages the data storage function of the Hadoop framework in a known manner.

Each of the computing nodes 30-34 and the parallel computing controller 22 may be realized as a physical processor, or a virtual machine on one or more processors or servers. During a parallel computing process, the worker nodes 30-34 may require relatively large amounts of data at various times. The Hadoop controller module 24 communicates with the cloud controller 40 to have cloud computing resources allocated for such data traffic communications. The virtual private network 28 handles control traffic such as reports from the computing nodes 30-34 to the job tracker module 26 regarding the current status of tasks assigned to the computing nodes. The control traffic communications require relatively little bandwidth and occur more frequently than data traffic communications. In this example, the virtual private network 28 is arranged to be set up the entire time during the parallel computing process and provides sufficient bandwidth and connectivity for efficient control traffic communications.

The virtual private network 28 in one example is realized as a virtual local area network (VLAN). A variety of VPN configurations may be used. The VPN 28 is not well suited for handling the relatively large amount of bandwidth required for a data traffic communication involving any of the computing nodes 30-34. The parallel computing controller 22 communicates with the cloud controller 40 so that cloud resources may be allocated to facilitate a data traffic communication involving any of the computing nodes 30-34. This approach allows for a relatively small amount of a network's resources to be allocated to the VPN 28 because control traffic for a parallel computing process presents a relatively light load. When a larger amount of bandwidth is required for data traffic communications, for example, the parallel computing controller 22 sends a communication to the cloud controller 40. Based at least in part on that received communication, the cloud computing controller allocates cloud computing resources to facilitate the data traffic communication involving at least one of the computing nodes 30-34.

In this example, the cloud computing resources 42 include a network controller 44, a virtual machine provisioning manager 46, a storage manager 48, additional controllers schematically shown at 50, network resources 52, compute servers 54, storage resources 56 and other resources schematically represented at 58. The cloud controller 40 and the network controller 44 select appropriate cloud network resources to meet the demands of a particular request from the parallel computing controller 22.

Figure 2:
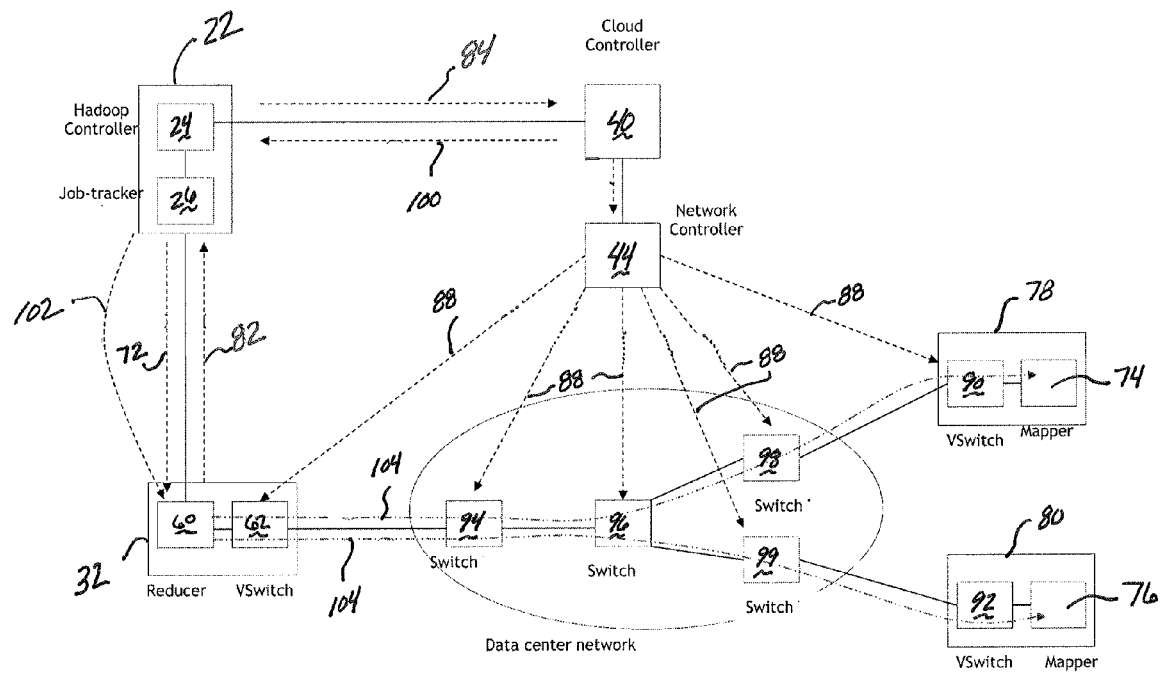
FIG. 2 schematically illustrates a process of allocating cloud computing resources to facilitate a data traffic communication according to an example embodiment of this invention.
Figure 3:
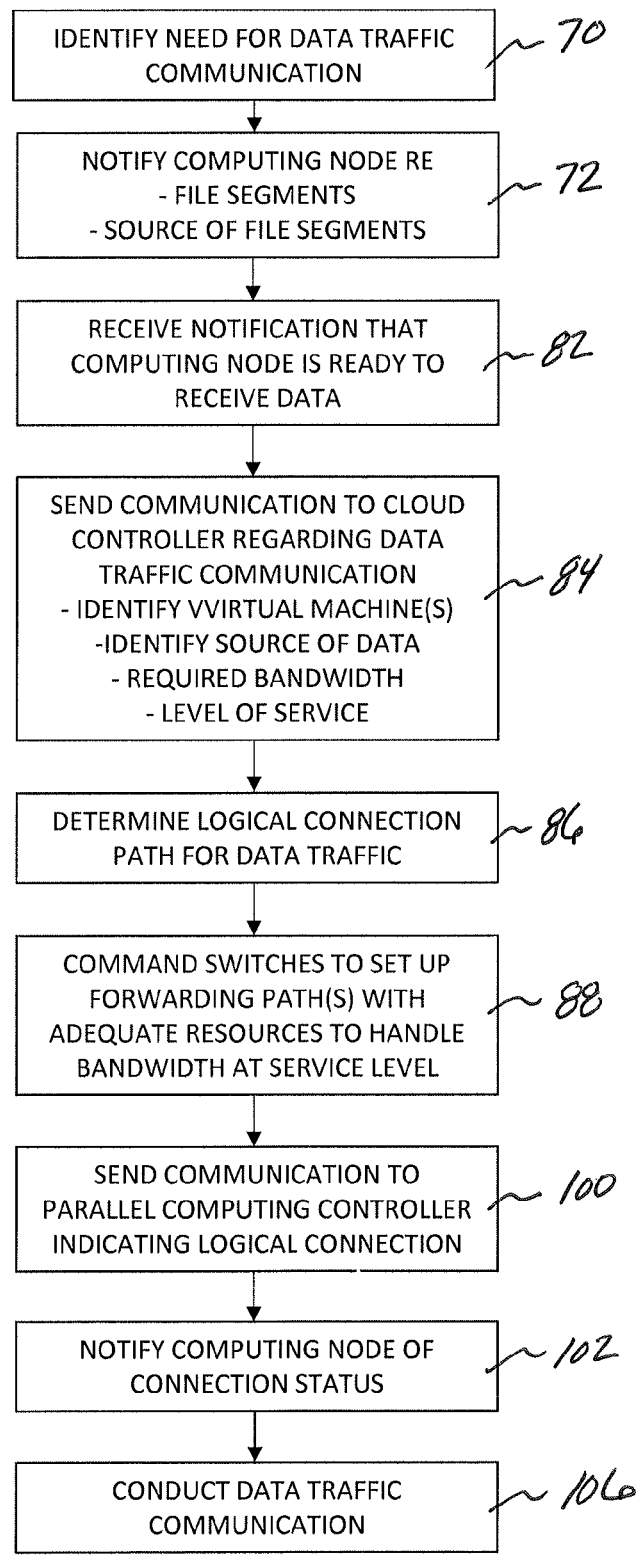
FIG. 3 is a flowchart diagram summarizing an example process of allocating cloud computing resources.

FIGS. 2 and 3 illustrate an example process for managing the cloud network resources to allocate appropriate portions of the cloud network resources 52 to facilitate data traffic communication involving at least one of the computing nodes 30-34 so that the VPN 28 need not be used for purposes of handling a data traffic communication. For purposes of discussion, the computing node 32 requires a data transfer. The computing node 32 includes a reducer module 60 and a virtual switch module 62.

The example process begins at 70 (FIG. 3) where the parallel computing controller 22 identifies the need for a data traffic communication. At 72, the job tracker module 26 notifies the reducer module 60 regarding the data that will be involved in the data traffic communication. In this example, the job tracker module 26 informs the reducer module 60 regarding the file segments that will be retrieved and the identity of a source of the file segments, which in this example includes a mapper module 74 and a mapper module 76 associated with virtual machines 78 and 80, respectively. At 82, the controller 22 receives a notification from the reducer module 60 that the computing node 32 is ready to receive the data.

At 84, the Hadoop controller module 24 sends a communication to the cloud controller 40 regarding the data traffic communication. In this example, the communication includes an identity of the virtual machine recipient of the data (e.g., the computing node 32), an identity of the source of the data (e.g., the mapper modules 74 and 76), other parameters such as protocol ID and port numbers that would facilitate the identification of the data flow in the network, a required amount of bandwidth and a service level parameter indicating a desired level of service for the data communication. According to one embodiment, any combination of the following 5 tuple to classify a data flow may be used: source IP address, destination IP address, source port, destination, and protocol ID. In the case of Hadoop, the protocol ID is TCP and the ports are TCP ports.) Based at least on part of the communication at 84, the cloud controller 40 determines a logical connection path for the data traffic communication at 86. Information regarding the data path is provided to the network controller 44, which commands cloud network resources at 88 to set up the appropriate path (e.g., set the appropriate forwarding entries in the forwarding table at the network elements). In this example, a plurality of switches are involved in the logical connection path for the data traffic communication. In the example of FIG. 2, a virtual switching module 90 of the virtual machine 78, a virtual switching module 92 of the virtual machine 80, and switches 94, 96, 98 and 99 are each involved in the logical connection path. While the commands at 88 are schematically shown going to the various switches, it is possible for the network controller 44 to command the switch 94, which in turn relays the command to the other switches along the path. As can be appreciated from the illustration, a logical connection path through the example switches establishes a path for communicating data from the mapper modules 74 and 76, respectively, to the reducer module 60.

Once the logical connections are set up, the cloud controller 40 provides a communication at 100 to the Hadoop controller module 24 regarding the status of the connection. At 102, the Hadoop controller module 24 notifies the reducer module 60 regarding the connection being available for the data communication. As schematically shown at 104, the reducer module 60 establishes TCP connections and initiates the transfer of data at 106.

Once all file segments have been transferred, the reducer module 60 informs the Hadoop controller module 24 that the data traffic communication is complete. The Hadoop controller module 24 then sends a communication to the cloud controller 40 that the logical connection established for the data traffic communication is no longer needed. The cloud controller 40 responsively tears down the logical connection (e.g., removing the respective forwarding entries in the network elements), which frees up the cloud computing resources for other tasks.

One feature of using this approach is that the VPN 28 used for control traffic associated with the parallel computing process can always be available and requires relatively little resource allocation because of the relatively light traffic load associated with the control traffic. At times when a data transfer is required, more of the cloud network resources are made available for that purpose and then released once the data communication is complete. The combination of using the VPN 28 for control traffic and the communication between the parallel computing controller 22 and the cloud controller 40 for purposes of allocating resources for a data traffic communication provides efficiencies for control traffic and data traffic transfers. With the disclosed example approach, network resource allocation is more efficient and a user realizes enhanced network performance.

Figure 4:
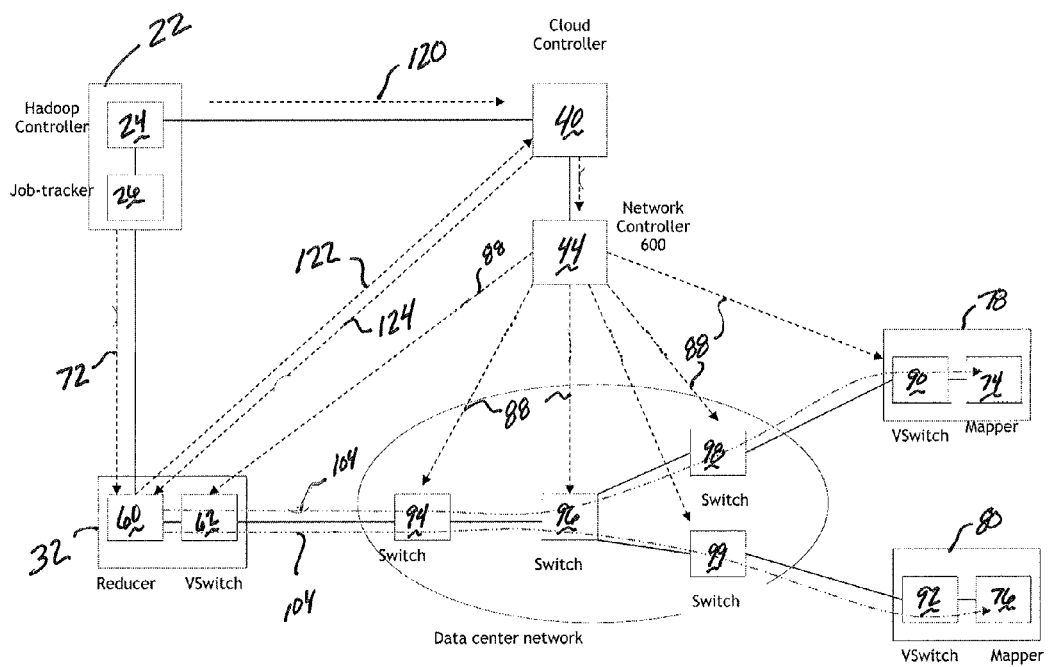
FIG. 4 schematically illustrates another example process of allocating cloud computing resources.

FIG. 4 schematically illustrates another example approach for communicating between the parallel computing controller 22 and the cloud controller 40 for purposes of allocating cloud computing resources for a data traffic communication. The primary difference between the approach schematically shown in FIG. 4 compared to that shown in FIG. 2 is that the computing node 32 is authorized for communicating directly with the cloud controller 40 rather than having all communications routed through the parallel computing controller 22.

In the example of FIG. 4, a communication at 120 from the Hadoop controller module 24 to the cloud controller 40 informs the cloud controller 40 of the identity of any computing nodes that are authorized for direct communication with the cloud controller 40 to set up an allocation of cloud computing resources for a data traffic communication. In this example, the job tracker module 26 communicates at 72 with the reducer module 60 to provide information regarding the file segments that are needed and the source of those file segments, which is the same as occurred in the example of FIG. 2. In the case of FIG. 4, once the virtual machine or computing node 32 is ready to receive the data, the reducer module 60 communicates with the cloud controller 40 as shown at 122. This communication includes a request to the cloud controller 40 to establish a point-to-point flow between the reducer module 60 and the mapper modules 74 and 76.

As was the case in the previous example, the cloud controller 40 determines a logical connection path with appropriate bandwidth to accommodate the traffic load at a desired service level. After the switches are commanded at 88 and the appropriate logical connections are set up, the cloud controller 40 communicates at 124 with the reducer module 60 regarding the status of the requested connections. Assuming the connections are appropriately set up, the reducer module 60 establishes TCP connections as schematically shown at 104 and initiates the data traffic communication.

Once the reducer module 60 receives all of the necessary file segments, the reducer module 60 communicates with the cloud controller 40 regarding the completion of the data traffic communication. The cloud controller 40 may then tear down the connections, which makes the cloud resources previously allocated for that data traffic communication available for other purposes.

In the example of FIG. 4, the Hadoop controller module 24 is not directly involved in the connection establishment process. This reduces the work load at the Hadoop controller module 24. The approach in FIG. 4 may reduce the amount of time required for establishing a connection to complete a data traffic communication. On the other hand, the approach of FIG. 4 requires introducing more complexity at each of the computing nodes because each of them requires sufficient capability for communicating directly with the cloud controller 40 if they are so authorized.

In some instances there will not be enough cloud resource available to set up a connection at a desired service level. The cloud controller 40 may establish a connection that accommodates the data traffic communication at a lower grade of service. The Hadoop controller module 24 (in the case of FIG. 2) or the reducer module 60 (in the case of FIG. 4) may accept or refuse the connection established by the cloud controller 40 when the service level does not correspond to the service level parameter communicated to the cloud controller 40. In situations where it is not possible to establish a connection in response to a request from the Hadoop controller module 24 or an authorized reducer module 60, the request may be repeated at a later time to facilitate the data transfer communication once resources are available.

As indicated above, a Hadoop framework and file segment transfer process are described for purposes of illustrating an example embodiment. Other parallel commuting arrangements may be used and other types of data traffic communications may be facilitated using the approach described above.

The connections established to facilitate the data traffic communication schematically shown in FIGS. 2 and 4 may involve some of the same switches or resources used for the VPN 28. In many circumstances the data traffic communication path will be different between virtual machines compared to the VPN path 28.

Figure 5A:
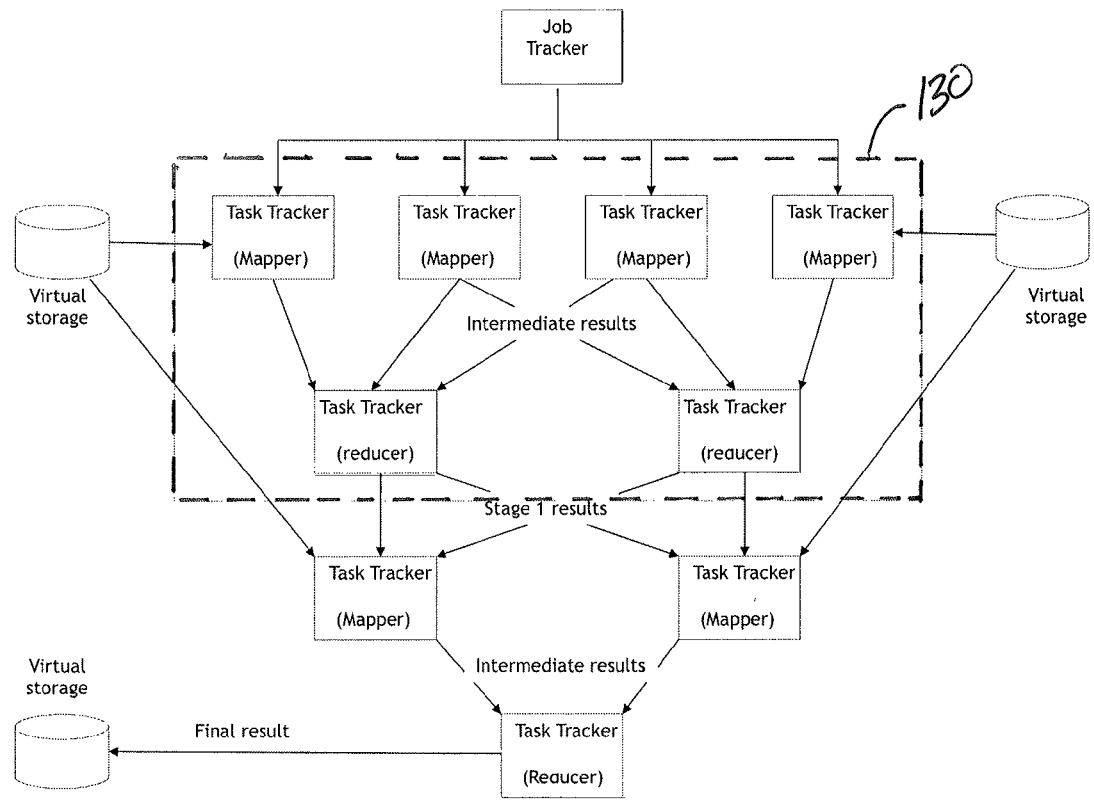
FIGS. 5A and 5B schematically illustrate a feature of another example process for allocating cloud computing resources.

The examples of FIGS. 2-4 involve cloud resource allocation on a point-to-point basis. The example of FIGS. 5A and 5B takes an aggregate approach by partitioning a parallel computing arrangement in a manner that involves multiple nodes or virtual machines for which logical connections are to be established by the cloud controller 40. In FIG. 5A, a partition 130 includes a plurality of virtual machines, computing nodes, or modules within them. Each of those are identified as being part of the partition 130. Some of the virtual machines within the partition 130 may be recipients of file segments for a particular data traffic communication session. The identifiers may be the MAC address, the IP address or a label that is assigned by the cloud controller 40 when a virtual machine is created. The cloud controller 40 may also be provided with information identifying virtual machines or entities that will transmit file segments for the partition 130. It is possible for a virtual machine within the partition 130 to be a transmitting and receiving entity.

Figure 5B:
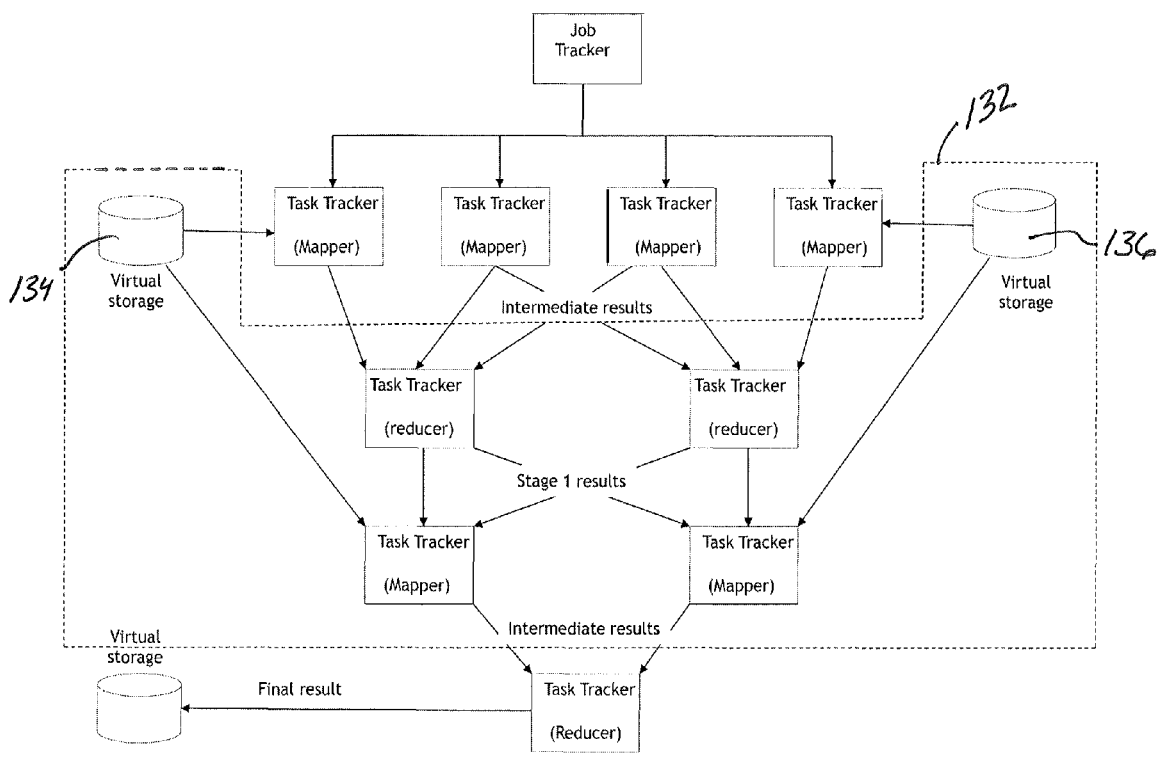

A request to the cloud controller 40 for resource allocation using the partitioning method of FIGS. 5A and 5B may include an indication of the maximum number of concurrent file-segment-transfer sessions allowed for any particular virtual machine or module. Additionally, information regarding desired performance characteristics, such as bandwidth and latency, may be included in the request information provided to the cloud controller 40.

Based on information provided by the Hadoop controller module 24, the cloud controller 40 configures network resources accordingly to set up any appropriate forwarding path and allocate the necessary resources to facilitate the data traffic communications involving the resources or virtual machines within the partition 130. The manner in which the cloud controller 40 determines the appropriate resources and allocates them may occur using known techniques, such as the hose model.

Using the aggregate traffic method including a partition for resource allocation involves setting up data paths on a segment-by-segment basis between switches. Each segment may have different traffic characteristics and multiple data flows between virtual machines may use the same segment.

FIG. 5B illustrates another partition 132 that includes some of the same virtual machines that were involved in the partition 130 and additional portions of the network, such as virtual storage modules 134 and 136. Comparing the example of FIGS. 5A and 5B to the examples of FIGS. 2-4, the file segment transfers are managed at the aggregate level (i.e., the entire partition) in the case of FIGS. 5A and 5B. This reduces the amount of interaction required between the parallel computing controller 22 and the cloud controller 40. The only time communications are necessary is at the time of setting up or tearing down the logical connections associated with a partition. While reducing the number of communications between the controllers 22 and 40 may be useful, there is an associated increased time during which more of the cloud computing resources are allocated and some of those resources may not be used during that entire time. In that regard, the approach of FIGS. 5A and 5B may be considered less efficient in terms of network resource utilization than that of FIGS. 2-4. One way in which the example of FIGS. 5A and 5B is more efficient is that no new transaction types between the job tracker module 26 and the task tracker modules of the computing nodes are required so that less enhancement of the computing nodes and the job tracker is needed.

While the illustrated examples show one parallel computing controller 22 communicating with one cloud controller 40, it is possible to have one cloud controller 40 supporting or communicating with a plurality of parallel computing controllers 22. Additionally, a parallel computing controller 22 may communicate with more than one cloud controller 40.

Using the example described arrangements, control traffic may be supported by a VPN to facilitate a parallel computing process. Network resources associated with the cloud computing system are allocated and de-allocated in a dynamic fashion to support non-control data traffic communications on an as-needed basis. Communication between the controllers 22 and 40 is effective to accomplish the allocation of the cloud computing resources to facilitate the data traffic communications involving at least one of the computing nodes.

Different features are associated with different examples described above. Those features are not necessarily limited only to the embodiment with which they are disclosed. In other words, one or more features of one embodiment may be incorporated into or combined with one or more features of another embodiment.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A computing system, comprising:
   at least one parallel computing controller device that comprises a processor and is configured to communicate control information with a plurality of computing nodes over a virtual private network; and
   a cloud computing controller device that comprises a processor and is configured to
      receive a communication from the parallel computing controller;
      based at least in part on the received communication, allocate cloud computing resources to facilitate data traffic communication between the cloud computing resources and at least one of the plurality of computing nodes; and
      establish a logical connection that provides a path between the allocated cloud computing resources and the at least one of the plurality of computing nodes for the data traffic communication, wherein the path excludes the parallel computing controller and cloud computing controller;
   wherein the parallel computing controller is configured to:
      determine a traffic profile for the data traffic communication,
      determine information that facilitates identifying data flow in the network,
      determine a service level of the communication, and
      provide an indication of the traffic profile; and
   wherein the cloud computing controller is configured to:
      receive the indication from the parallel computing controller,
      identify cloud network resources capable of handling the indicated traffic profile, and
      allocate the identified cloud network resources to facilitate the data traffic communication.

2. The system of claim 1, wherein the cloud computing controller is configured to tear down the logical connection once the data traffic communication is complete.

3. The system of claim 1, wherein the communication from the parallel computing controller includes the indication of the determined traffic profile, an indication of the at least one of the computing nodes involved in the data traffic communication, and an indication of the determined service level for the data traffic communication.

4. The system of claim 3, wherein the cloud computing controller is configured to:
determine the path for the logical connection, the determined path being able to support the traffic profile and service level of the data traffic communication; and
notify the parallel computing controller if the logical connection is established,
wherein to establish the logical connection, the cloud computing controller is configured to command a plurality of switches of the cloud computing resources to establish the logical connection.

5. The system of claim 4, wherein
the parallel computing controller is configured to notify the at least one of the computing nodes that the logical connection is established; and
the at least one of the computing nodes is able to conduct the data traffic communication based on being notified of the logical connection by the parallel computing controller.

6. A computing system, comprising:
at least one parallel computing controller configured to communicate control information with a plurality of computing nodes over a virtual private network; and
a cloud computing controller configured to:
receive a communication from the parallel computing controller,
based at least in part on the received communication, allocate cloud computing resources to facilitate data traffic communication involving at least one of the plurality of computing nodes, and
establish a logical connection that provides a path between the allocated cloud computing resources and the at least one of the plurality of computing nodes for the data traffic communication, wherein the path excludes the parallel computing controller and cloud computing controller;
wherein the communication from the parallel computing controller identifies at least one of the plurality of computing nodes that is authorized to communicate with the cloud computing controller; and
wherein the parallel computing controller is configured to:
determine a traffic profile for the data traffic communication,
determine information that facilitates identifying data flow in the network,
determine a service level of the communication, and
provide an indication of the traffic profile; and
wherein the cloud computing controller is configured to:
receive a request from the at least one authorized computing node, the request indicating the traffic profile, data flow identifiers, and the service level for the data traffic communication,
identify cloud computing resources capable of supporting the traffic profile and service level, and
allocate the identified cloud network resources to facilitate the data traffic communication.

7. The system of claim 6, wherein
the request from the authorized computing node includes an indication of at least one source or recipient of data involved in the data traffic communication;
the request from the authorized computing node includes an indication of a quality of service for the data traffic communication;
the cloud computing controller determines the logical connection that is capable of handling the traffic for the data traffic communication between the authorized computing node and the indicated source or recipient at the indicated quality of service;
the authorized computing node provides a completion indication to the cloud computing controller that the data traffic communication is complete; and
the cloud computing controller removes the logical connection responsive to the completion indication.

8. The system of claim 1, wherein
the data traffic communication comprises a plurality of data unit transfers;
the communication from the parallel computing controller includes
an identifier of a partition that includes a plurality of the computing nodes,
an identifier for the computing nodes that will be sending or receiving data for the data unit transfers,
an allowable number of concurrent data unit transfers for the identified computing nodes, and
a desired performance characteristic for the data unit transfers, respectively;
the cloud computing controller determines forwarding tables among switches included in the cloud computing resources, the forwarding tables establishing logical connections among the computing nodes that are included in the partition;
the cloud computing controller notifies the parallel computing controller when the forwarding tables are established;
the parallel computing controller informs the plurality of computing nodes in the partition that the data unit transfers of the data traffic communication may proceed;
the parallel computing controller provides a completion notification to the cloud computing controller when the data unit transfers are complete; and
the cloud computing controller deletes the forwarding tables based on the completion notification.

9. A method of managing resources for parallel computing in a cloud computing system, comprising:
communicating control information between a parallel computing controller and a plurality of computing nodes over a virtual private network;
determining each of the following at the parallel computing controller:
a traffic profile for data traffic communication between the cloud computing resources and at least one of the plurality of computing nodes;
information that facilitates identifying data flow in the network,
a service level of the communication, and
receiving, from the parallel computing controller and at a cloud computing controller, a communication that indicates the traffic profile;
identifying and allocating cloud computing resources by the cloud computing controller, based at least in part on the received communication, to facilitate the data traffic communication between the cloud computing resources and at least one of the plurality of computing nodes; and
establishing a logical connection that provides a path between the allocated cloud computing resources and the at least one of the plurality of computing nodes for the data traffic communication, wherein the path excludes the parallel computing controller and cloud computing controller.

10. The method of claim 9, comprising:
tearing down the logical connection once the data traffic communication is complete.

11. The method of claim 9, comprising:
determining an amount of bandwidth for the data traffic communication;
providing an indication of the determined amount of bandwidth from the parallel computing controller to the cloud computing controller;
the cloud computing controller identifying cloud computing resources capable of handling the determined amount of bandwidth; and
the cloud computing controller allocating the identified cloud computing resources to facilitate the data traffic communication.

12. The method of claim 11, wherein the communication from the parallel computing controller includes the indication of the determined amount of bandwidth, an indication of the at least one of the computing nodes involved in the data traffic communication, and an indication of the determined service level for the data traffic communication.

13. The method of claim 12, comprising using the cloud computing controller to:
determine the path for the logical connection, the determined path being able to support the traffic load of the data traffic communication; and
notify the parallel computing controller if the logical connection is established;
wherein establishing the logical connection comprises commanding, by the cloud computing controller, a plurality of switches of the cloud computing resources to establish the logical connection.

14. The method of claim 13, comprising:
notifying the at least one of the computing nodes that the logical connection is established;
wherein the at least one of the computing nodes is able to conduct the data traffic communication based on being notified of the logical connection by the parallel computing controller.

15. The method of claim 9, wherein
the communication from the parallel computing controller identifies at least one of the plurality of computing nodes that is authorized to communicate with the cloud computing controller; and
the method comprises:
receiving a request at the cloud computing controller from the authorized computing node, the request indicating bandwidth needed for the data traffic communication;
identifying cloud computing resources capable of providing the bandwidth; and
allocating the identified cloud computing resources to facilitate the data traffic communication.

16. The method of claim 15, wherein
the request from the at least one authorized computing node includes an indication of at least one source or recipient of data involved in the data traffic communication;
the request from the authorized computing node includes an indication of a quality of service for the data traffic communication; and
the method comprises
the cloud computing controller determining the logical connection that is capable of handling the traffic for the data traffic communication between the authorized computing node and the indicated source or recipient at the indicated quality of service;
the authorized computing node providing a completion indication to the cloud computing controller that the data traffic communication is complete; and
the cloud computing controller removing the logical connection responsive to the completion indication.

17. The method of claim 9, wherein
the data traffic communication comprises a plurality of data unit transfers;
the communication from the parallel computing controller includes
an identifier of a partition that includes a plurality of the computing nodes,
an identifier for the computing nodes that will be sending or receiving data for the data unit transfers,
an allowable number of concurrent data unit transfers for the identified computing nodes, and
a desired performance characteristic for the data unit transfers, respectively; and the method comprises:
the cloud computing controller determining forwarding tables among switches included in the cloud computing resources, the forwarding tables establishing logical connections among the computing nodes that are included in the partition;
the cloud computing controller notifying the parallel computing controller when the forwarding tables are established;
the parallel computing controller informing the plurality of computing nodes in the partition that the data unit transfers of the data traffic communication may proceed;
the parallel computing controller providing a completion notification to the cloud computing controller when the data unit transfers are complete; and
the cloud computing controller deleting the forwarding tables based on the completion notification.

18. The system of claim 1, wherein
the communication from the parallel computing controller identifies at least one of the plurality of computing nodes that is authorized to communicate with the cloud computing controller; and
the cloud computing controller is configured to:
receive a request from the at least one authorized computing node, the request indicating the determined traffic profile, data flow identifiers, and the determined service level for the data traffic communication,
wherein the cloud computing resources identified by the cloud computing controller are also capable of supporting the service level.

* * * * *